US011538112B1

(12) United States Patent
Singh et al.

(10) Patent No.: US 11,538,112 B1
(45) Date of Patent: Dec. 27, 2022

(54) MACHINE LEARNING SYSTEMS AND METHODS FOR PROCESSING DATA FOR HEALTHCARE APPLICATIONS

(71) Applicant: DocVocate, Inc., Belmont, CA (US)

(72) Inventors: Himanshu Singh, Belmont, CA (US); Andrew Atwal, Belmont, CA (US)

(73) Assignee: DocVocate, Inc., Belmont, CA (US)

( * ) Notice: Subject to any disclaimer, the term of this patent is extended or adjusted under 35 U.S.C. 154(b) by 124 days.

(21) Appl. No.: 16/440,972

(22) Filed: Jun. 13, 2019

Related U.S. Application Data

(60) Provisional application No. 62/685,678, filed on Jun. 15, 2018.

(51) Int. Cl.
*G06Q 40/08* (2012.01)
*G06Q 10/10* (2012.01)
*G06N 20/20* (2019.01)

(52) U.S. Cl.
CPC ............ *G06Q 40/08* (2013.01); *G06N 20/20* (2019.01); *G06Q 10/10* (2013.01)

(58) Field of Classification Search
None
See application file for complete search history.

(56) References Cited

U.S. PATENT DOCUMENTS

| 8,392,207 | B2 * | 3/2013 | Olaniyan | G06Q 40/08 705/2 |
|---|---|---|---|---|
| 10,127,502 | B2 * | 11/2018 | Rourke | G16H 20/10 |
| 2005/0137912 | A1 * | 6/2005 | Rao | G06Q 40/08 705/4 |
| 2008/0114620 | A1 * | 5/2008 | Donnelli | G06Q 40/08 705/4 |
| 2011/0066425 | A1 * | 3/2011 | Hudgins | G06Q 10/10 704/10 |
| 2013/0054259 | A1 * | 2/2013 | Wojtusiak | G06Q 10/10 705/2 |
| 2013/0159025 | A1 * | 6/2013 | Olaniyan | G06Q 10/10 705/4 |

(Continued)

OTHER PUBLICATIONS

Ghani, "Data Mining to Predict and Prevent Errors in Health Insurance Claims Processing", https://web.archive.org/web/20140327064320/http://www.cs.cmu.edu/~mohitkum/papers/kdd10_rework.pdf , 2014 (Year: 2014).*

Gooch, K., "Denial rework costs providers roughly $118 per claim: 4 takeaways", https://web.archive.org/web/20170630213813/https://www.beckershospitalreview.com/finance/denial-rework-costs-providers-roughly-118-per-claim-4-takeaways.html , 2017 (Year: 2017).*

(Continued)

*Primary Examiner* — Ryan D Donlon
*Assistant Examiner* — Mark A Malkowski
(74) *Attorney, Agent, or Firm* — Nixon Peabody LLP

(57) ABSTRACT

A method of predicting an outcome of a prior-authorization, claim, or appeal includes receiving, at a server, a natural language data file representing doctors notes from a provider visit related to a service instance; receiving, at the server, a structured data set including patient profile data, diagnosis and procedure codes, and quantitative data related to a payment requested; processing at least the natural language data file using a medical dictionary to output a set of key medical terms; processing, using a supervised machine learning algorithm, the structured data set and the set of key medical terms to predict an outcome of the payment requested; and outputting an indication of the predicted outcome of the payment requested.

20 Claims, 7 Drawing Sheets

(56) References Cited

U.S. PATENT DOCUMENTS

| | | | | |
|---|---|---|---|---|
| 2014/0200928 A1* | 7/2014 | Watanabe | G06Q 40/08 | 705/4 |
| 2014/0249865 A1* | 9/2014 | Ghani | G06N 20/00 | 705/4 |
| 2015/0317337 A1* | 11/2015 | Edgar | G16H 50/70 | 707/751 |
| 2016/0085919 A1* | 3/2016 | Sohr | G06Q 10/10 | 705/3 |
| 2016/0253461 A1* | 9/2016 | Sohr | C25B 11/04 | 705/3 |
| 2016/0342751 A1* | 11/2016 | Alstad | G16H 40/20 | |
| 2017/0308652 A1* | 10/2017 | Ligon | G06Q 10/10 | |
| 2018/0004904 A1* | 1/2018 | Phillips | G16H 50/30 | |
| 2019/0005012 A1* | 1/2019 | Priestas | G06N 20/00 | |
| 2019/0325011 A1* | 10/2019 | Saripalli | G16H 50/70 | |
| 2020/0364404 A1* | 11/2020 | Priestas | G06F 40/284 | |

OTHER PUBLICATIONS

Marting, R., aafp.org, "The Cure for Claims Denials", https://web.archive.org/web/20151113062443/https://www.aafp.org/fpm/2015/0300/p7.html , 2015 (Year: 2015).*

Hayes, "6 Steps to Denial Management in CPS", https://centricityusers.com/wp-content/uploads/2014/10/HAYES-6-Steps-to-Denial-Management-in-CPS-CHUG-Oct-2014.pdf publication date shown on: https://centricityusers.com/wp-content/uploads/2014/10/ (Year: 2014).*

Ciprian, "Reducing Clinical Rejections & Denials with Hosted Claims Manager" https://centricityusers.com/wp-content/uploads/2015/10/BO5_01-Reducing-Clinical-Rejections-Denials-with-Hosted-Claims-Manager.pdf publication date shown on https://centricityusers.com/wp-content/uploads/2015/10/ (Year: 2015).*

* cited by examiner

| DV Rank | Claim | Denied Amount | DV Estimate | Payer | Appeals deadline ↑ | Patient | Agent | |
|---|---|---|---|---|---|---|---|---|
| 1 | 23432 | $1,000 | $990 | Workers Comp - Farmers | 02/09/2017 | Test WC | Andrew Atwal | ... |
| 2 | 97191 | $1,000 | $980 | AIG - California | 06/15/2017 | Tester McPerso | Himanshu Singh | ... |
| 3 | 1111 | $1,000 | $970 | Workers Comp - Farmers | 06/23/2017 | Temp Patient | Jennifer Hand | ... |

MACHINE LEARNING SYSTEMS AND METHODS FOR PROCESSING DATA FOR HEALTHCARE APPLICATIONS

CROSS-REFERENCE TO RELATED APPLICATIONS

This application claims the benefit of, and priority to, U.S. Provisional Patent Application No. 62/685,678, filed on Jun. 15, 2018, which is hereby incorporated by reference herein in its entirety.

TECHNICAL FIELD

The present disclosure relates generally to machine learning algorithms and methods for processing structured and natural language data to output likelihoods of success and automatically populate letter templates.

BACKGROUND

Data sources in the healthcare industry are generally output and stored by a variety of systems and in a variety of formats. For instance, before or after a healthcare provider (e.g., a hospital, a physician's office, etc.) provides a service to a patient, the provider often submits an insurance claim to a payer (e.g., the patient's health insurance company) for payment for the service(s). In some cases, the insurance claim is denied by the payer or the payer only pays a portion of the billed amount (often referred to as an adjustment). The provider may appeal the denial or adjustment of the insurance claim to the payer or, in some cases, a third party (e.g., an arbitrator).

SUMMARY

The insurance claim or appeal may contain data from a variety of sources, including data from the electronic health records "EHR" system (e.g. doctor notes, diagnosis and service codes, test results, etc.), and data from the provider's revenue cycle management ("RCM") that includes medical and billing software, to track patient care episodes from registration to appointment scheduling and payment. The providers submit this information as prior-authorizations, claims and appeals in a variety of different electronic and paper formats. For instance, some payers allow these forms to be submitted electronically, but most do not and require paper submission. The formats may include structured data fields including the procedure and diagnosis codes (e.g., CPT codes), data from .pdf or other document types in the form of letters regarding the claims or appeals, natural language data in the form of text representing doctor's notes, numerical fields relating the billing and payment history, profile information of payments as structured data and others.

Once this data is submitted to payers, the payers' systems utilize their own algorithms to process the data and determine an outcome which is usually an acceptance, denial or partial acceptance of payment. The payers then submit their decision in a variety of forms back to the provider, including by letter, through a data portal, and others. The decision may also include data in a variety of forms including text based data from prose relating to a letter, data output from a payer portal in text delimited form, or other formats.

Based on this data submitted by providers, payers generally utilize algorithms for accepting or denying prior-authorizations, claims, or appeals, and those algorithms are largely unknown outside the payers, and therefore hard to predict beyond basic threshold rules that include number of service visits for a type of service (e.g. six physical therapy sessions for back pain). This introduces tremendous inefficiencies into the system, including back and form with the provider and payer data sending, etc. Therefore, machine learning algorithms have been developed based on the data sources available that can automatically train and input data into the algorithms to predict the outcomes of the payers' decisions, based on the documents and other data available. Additionally, systems and method have been developed to automatically populate data fields submitted to providers, including letter templates based on structured and natural language data.

It would be advantageous for providers to have a predictor of claim success prior to filing a claim, and additionally a predictor for potential reasons for claim denial, in order to determine whether to file the claim, make edits prior to filing the claim, and which edits should be made to the claim. It would be advantageous for providers to have a system suggest further action(s) (in real-time, in some implementations) by the provider, or provider billing team, in order to increase likelihood of claim success. It would be advantageous for providers to better understand clinical diagnosis patterns by being given predictive outcomes based on historical data. In the event a claim is denied by a payer, it would be advantageous for the provider to prioritize a plurality of denied insurance claims for appeal to one or more payers based on the predicted outcome of the appeal and/or the predicted value of the appeal. It would be advantageous for providers to obtain real-time, filterable analytics (in some implementations, automated notifications) based on data sources including providers outside of their own medical group, hospital, or health system. It would further be advantageous to provide a method of populating an appeal document, or any element of an entire appeal package, for submission to a payer. It would further be advantageous for providers to utilize data analysis to help settle or auto-settle claims with any third-party. The present disclosure is directed to solving these and other problems.

All of the above advantages, and more, can be applied to aid any party within the healthcare system, including payers and patients. Further, the above data outputs can also be used by all parties to make more informed, faster insurance plan coverage changes. For example, if a new patient treatment is showing positive testing and clinical signs, yet claims data shows a high denial rate, adjustments can be made to insurance coverage. A further example, claims data analysis can be combined with larger clinical data sets to best determine the optimal insurance coverage plan to support population health and economic feasibility.

The output of the algorithms described herein provide at least a portion of a foundation for unique cloud-based SaaS applications. These applications can be used to serve unmet needs for many parties involved in healthcare, including but not limited to, providers, payers, and patients. More importantly, the US and global healthcare systems would benefit in the areas of efficiency, scalability, flexibility, and transparency.

According to some implementations of the present disclosure, a method of prioritizing denied insurance claims for appeal to one or more payers comprises training a first machine learning algorithm to determine a percentage likelihood that an appeal of an insurance claim to a first payer will result in a paid insurance claim; training a second machine learning algorithm to determine a percentage likelihood that an appeal of an insurance claim to a second payer will result in a paid insurance claim; receiving a first set of data associated with a first insurance claim denied by the first payer; receiving a second set of data associated with a second insurance claim denied by the second payer; inputting at least a portion of the first set of data into the first machine learning algorithm; using the first machine learning algorithm, determining a first percentage likelihood that an appeal of the first insurance claim to the first payer will result in a first paid claim; inputting at least a portion of the second set of data into the second machine learning algorithm; and using the second machine learning algorithm, determining a second percentage likelihood that an appeal of the second insurance claim to the second payer will result in a second paid claim.

According to some implementations of the present disclosure, a method of prioritizing denied insurance claims for appeal to one or more payers comprises training a first machine learning algorithm to predict outcomes of insurance claim appeals to a first payer; training a second machine learning algorithm to predict outcomes of insurance claim appeals to a second payer different from the first payer; receiving a first set of data associated with a first insurance claim denied by the first payer; receiving a second set of data associated with a second insurance claim denied by the second payer; inputting at least a portion of the first set of data into the first machine learning algorithm; using the first machine learning algorithm, predicting an outcome of an appeal of the first insurance claim to the first payer; inputting at least a portion of the second set of data into the second machine learning algorithm; using the second machine learning algorithm, predicting an outcome of an appeal of the second insurance claim to the second payer; and displaying the predicted outcomes on a display device.

According to some implementations of the present disclosure, a method of prioritizing denied insurance claims for appeal to one or more payers comprises training a plurality of machine learning algorithms to predict outcomes of insurance claim appeals, each of the plurality of machine learning algorithms being associated with a respective one of a plurality of payers; receiving a plurality of sets of data, each of the plurality of sets of data being associated with a respective insurance claim denied by one of the plurality of payers; for each of the received plurality of sets of data, inputting at least a portion of the received plurality of sets of data into a respective one of the plurality of machine learning algorithms that is associated with a respective one of the plurality of payers and, using the respective one of the plurality of machine learning algorithms, predicting an outcome of an appeal to the respective one of the plurality of payers; and displaying the predicted outcomes on a display device.

According to some implementations of the present disclosure, a method of prioritizing denied insurance claims for appeal to one or more payers comprises training a plurality of machine learning algorithms to predict outcomes of insurance claim appeals, each of the plurality of machine learning algorithms being associated with a respective one of a plurality of payers; receiving a set of data associated with a plurality of denied insurance claims, each of the denied insurance claims being denied by one of the plurality of payers; dividing the set of data into groups of data, each of the groups of data being associated with insurance claims denied by a respective one of the plurality of payers; for each of the groups of data associated with insurance claims denied by a respective one of the plurality of payers, inputting at least a portion of the received set of data into a respective one of the plurality of machine learning algorithms that is associated with a respective one of the plurality of payers; using the respective one of the plurality of machine learning algorithms, predicting an outcome of an appeal to the respective one of the plurality of payers; grouping the plurality of denied insurance claims into a first group associated with a predicted approved outcome and into a second group associated with a predicted denial outcome; and displaying at least the first group associated with a predicted approved outcome on a display device.

According to some implementations of the present disclosure, a method of populating an appeal document for submission to a payer comprises receiving a set of data associated with an insurance claim denied by a payer; selecting, based in part on the received set of data, a machine learning algorithm associated with the payer from a plurality of machine learning algorithms, each of the plurality of machine learning algorithms being associated with a respective payer; inputting at least a portion of the received set of data into the selected machine learning algorithm associated with the payer; based at least in part on the inputted set of data, populating a plurality of fields of the appeal document with appeal data for submission to the payer to appeal the denied insurance claim.

According to some implementations of the present disclosure a method of populating an appeal document for submission to a third party comprises analyzing a set of documents to determine a master set of key words and phrases used in the set of documents, the set of documents including insurance claim forms prepared by one or more providers, insurance claim appeal forms prepared by one or more providers, doctor notes associated with one or more patients, explanation of benefit forms prepared by one or more payers, claim denial letters prepared by one or more payers, claim acceptance letters prepared by one or more payers, or any combination thereof, the determining the master set of key words and phrases being based at least in part on (i) words contained in a medical library, (ii) words contained in documents associated with approved medical claims, (iii) or a combination of (i) and (ii); training a first payer machine learning algorithm to (i) predict outcomes of insurance claim appeals submitted to a first payer and (ii) identify a first payer set of key words and phrases to be used in populating an appeal document to be sent to the first payer, the training including providing the first payer machine learning algorithm with a first plurality of subsets of the master set of key words and phrases and a first plurality of corresponding outcomes; training a second payer machine learning algorithm to (i) predict outcomes of insurance claim appeals submitted to a second payer and (ii) identify a second payer set of key words and phrases to be used in populating an appeal document to be sent to the second payer, the training including providing the second payer machine learning algorithm with a second plurality of subsets of the master set of key words and phrases and a second plurality of corresponding outcomes, the second plurality of subsets of the master set of key words and phrases being different than the first plurality of subsets of the master set of key words and phrases; receiving a first set of data associated with a first denied insurance claim, the first set of data including a first payer name, a first payer address, a first payer phone number, doctor notes associated with a first patient, a first patient name, a first patient address, a first patient phone number, a first claim number, a first insurance group number, a first plan number, a first services provided date, a first claim denial date, a first procedure code, a first diagnosis code, a first billed amount, a first allowed amount, a first deductible amount, a first copay amount, a first adjustment code, a first payment amount, a first appeal deadline date, a first provider name, a first provider address, a first provider phone number, or any combination thereof; selecting, based in part on the received first set of data, the trained first payer machine learning algorithm from a plurality of trained machine learning algorithms; inputting at least a portion of the received first set of data into the first payer machine learning algorithm; based at least in part on the inputted first set of data, populating a plurality of fields of an appeal document with appeal data for use in appealing the first denied insurance claim to the first payer, the appeal data including select portions of the doctor notes associated with the first patient, the first payer name, the first payer address, the first payer phone number, the first patient name, the first patient address, the first patient phone number, the first claim number, the first insurance group number, the first plan number, the first services provided date, the first claim denial date, the first procedure code, the first diagnosis code, the first billed amount, the first allowed amount, the first deductible amount, the first co-pay amount, the first adjustment code, the first payment amount, the first appeal deadline date, the first provider name, the first provider address, the first provider phone number, or any combination thereof, the select portions of the doctor notes associated with the first patient being selected based at least in part on the first payer set of key words and phrases identified by the first payer machine learning algorithm.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 2B is an exemplary ordered database of appeal candidate entries according to some implementations of the present disclosure;

Figure 1:
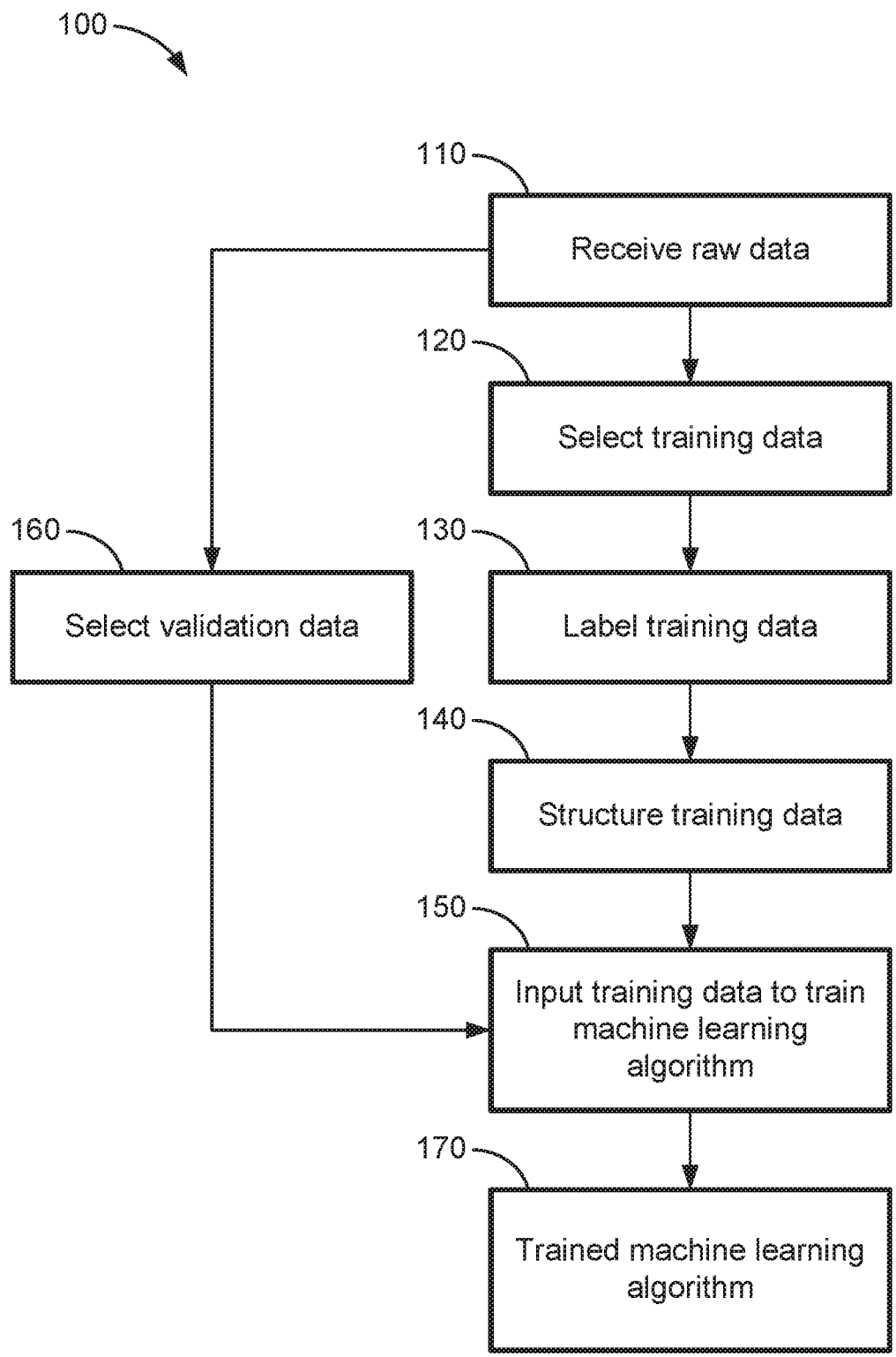
FIG. 1 is a process flow diagram of a method for training one or more machine learning algorithms according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Overview

Data sources in the healthcare industry are generally output and stored by a variety of systems and in a variety of formats. When a provider (e.g., a healthcare provider, hospital, physician's office, etc.) provides a service to a patient (e.g., an exam, surgery, a diagnostic, a test, treatment, therapy, etc.), the provider often submits an insurance claim to a payer (e.g., a health insurance company) for at least partial payment for the services rendered (or, for services to be rendered in the future). In some cases, the provider may also submit a prior-authorization request before performing the services. Before submitting a claim to the payer, the provider inputs information from an EHR that contains, for example, procedure codes, diagnosis codes, and other information relating to the rendered service and information relating to the patient. The procedure and/or diagnosis codes contained in the electronic health record may be extracted from, for example, doctor notes and/or charts, diagnosis information from exams, lab tests, or notes from radiologists, etc.

The insurance claim or appeal may contain data from a variety of sources, including data from EHR systems (e.g. doctor notes, diagnosis and service codes, test results, etc.), and data from the provider's revenue cycle management ("RCM") that includes medical and billing software, to track patient care episodes from registration to appointment scheduling and payment. The providers submit this information as prior-authorizations, claims and appeals in a variety of different electronic and paper formats. For instance, some payers allow these forms to be submitted electronically, but most do not and require paper submission. The formats may include structured data fields including the procedure and diagnosis codes (e.g., CPT codes), data from .pdf or other document types in the form of letters regarding the claims or appeals, natural language data in the form of text representing doctor's notes, numerical fields relating the billing and payment history, profile information of payments as structured data and others.

Once this data is submitted to payers, the payers' systems often utilize their own algorithms or models to help process the data and determine an outcome which is usually an acceptance, denial or partial acceptance of payment. Payers also layer in some human review, which typically increases with claim complexity and extended claim iterations (back and forth communication with providers, patients, or third-party companies). The payers then submit their decision in a variety of forms back to the provider, including by letter, through a data portal, and others. The decision may also include data in a variety of forms including text based data from prose relating to a letter, data output from a payer portal in text delimited form, or other formats.

The various data fields that may be output from the RCM, EHR and other systems may include a variety of structured and unstructured data, natural language text and other data. For instance, the first step in a patient visit is to enter registration data from the visit. For example, this may include:

Patient profile information (e.g. gender, height, weight, history of services);
Time and date stamp of visit;
Chief complaint, which may include natural language or structured data entered from choices for a specific provider;
Doctors notes, which frequently will be in both natural language and structured data format;
Chart notes;
Test results, including quantitative structured data and natural language text from other;
Diagnosis/ICD codes;
Services/CPT codes;
Prior authorization information from payer; and
Other information or data.

Next, a claim may be submitted to a payer that may include the prior information, and as an example, may also include:
Dollar amount for services
Patient ID or other reference number specific to payer
Then, a payer may respond with an acceptance or denial. As an example, in the case of denial, the payer may submit:
a quantitative value indicating the amount they will pay; and
an adjustment code if there are reasons for the denial.

Then, if the provider appeals the denial, the provider may submit an appeal package that includes any or all of the above data, and includes a letter that describes the reasons for appeal, which will typically contain natural language text. After that, the payer will deny or accept the appeal (or partially) which will provide more output data that can be fed into machine learning algorithms.

The likelihood a successful prior-authorization, claim, or appeal may depend on a variety of factors. For example, different payers (e.g., insurance companies) may have different algorithms and rules or practices that will affect the likelihood of a successful appeal. In other words, a claim that is otherwise identical to a claim successfully appealed to a first payer may be denied on appeal to a second payer. Similarly, the content of the appeal letter often plays a role in the likelihood of a successful appeal. For example, certain key words or phrases contained in the appeal letter may aid in increasing the likelihood that the appeal will be successful. Particularly, key medical phrases or doctor notes regarding the diagnosis may play a role in an appeal.

Payers generally utilize algorithms for accepting or denying prior-authorizations, claims, or appeals, and those algorithms are largely unknown outside the payers, and therefore hard to predict beyond basic threshold rules that include number of service visits for a type of service (e.g., six physical therapy sessions for back pain). This introduces tremendous inefficiencies into the system, including back and forth with the provider and payer data sending, etc.

Therefore, machine learning algorithms have been developed based on the data sources available that can automatically train and input data into the algorithms to predict the outcomes of the payers' decisions, based on the documents and other data available. Additionally, systems and method have been developed to automatically populate data fields submitted to providers, including letter templates based on structured and natural language data.

Training Machine Learning Algorithms

Referring to FIG. 1, a method 100 for training one or more machine learning algorithms includes a first step 110, a second step 120, an optional third step 130, a fourth step 140, an optional fifth step 150, and a sixth step 160. The method 100 can be used to train machine learning algorithms for use in methods of prioritizing denied insurance claims for appeal (e.g., method 200 of FIG. 2A) and/or methods of populating fields of an appeal document (e.g., method 300 of FIG. 3).

The first step 110 of the method 100 includes receiving raw data from a set of documents or other sources described above. The data may be from the sources described above, or other documents that can include, for example, insurance claim forms prepared by one or more providers, insurance claim appeal forms prepared by one or more providers, doctor notes associated with one or more patients, explanation of benefit forms prepared by one or more payers, claim denial letters prepared by one or more payers, claim acceptance letters prepared by one or more payers, or any combination thereof. In some implementations, the raw data is received in a machine readable format. If required, the first step 110 can further include converting text in scanned documents (e.g., handwritten doctor notes or charts) or electronic documents (e.g., portable document format files) to machine readable format, using, for example, optical character recognition.

Generally, machine learning algorithms require training data to identify the features of interest that they are designed to detect and predict an outcome. The second step 120 of the method 100 includes selecting training data from the raw data received during the first step 110. All or a portion of the raw data received during the first step 110 can be selected). In some implementations, the second step 120 includes selecting training data from the raw data that is associated with an individual payer (e.g., one of a plurality of insurance companies). In such implementations, as described in further detail below, selecting data associated with an individual payer results in a trained machine learning algorithm that is specifically tailored to, for example, predict appeal outcomes for that individual payer.

In some examples, the training data will have a time window of one year, two years, three years, 6 months or other suitable time windows. In some examples, the machine learning algorithms associated with each payer in a database may be newly trained with a new time window of data. This will ensure that the machine learning algorithms are up to date with the practices of each payer, which may evolve over time and therefore not be biased by older data. In other words, the machine learning algorithms described herein can be updated and optimized with new training data to account for new appeal decisions, new claims, etc. associated with each payer in the database.

The third step 130 of the method 100 includes labeling sets of the training data selected during the second step 120. More specifically, the selected training data is labeled by grouping the selected training data into sets, for example, each set being designated as (1) being associated with an insurance prior-authorization, claim, or appeal that has been accepted by the payer or (2) being associated with an insurance prior-authorization, claim, or appeal that has been denied by the payer. For example, the selected data can be labeled with designations such as "appeal accepted," "appeal denied," "claim paid," "claim not paid," "claim paid in full," "claim paid in part," etc. As described in further detail below, this labeling of sets of the selected training data aids in training the machine learning algorithm to predict, for example, whether an insurance claim appeal will be accepted or denied based on new inputted data.

The optional fourth step 140 of the method 100 includes structuring the selected, labeled training data. This step is optional, and may include pre-processing of data to make it clean for inputting into the machine learning algorithm. In some examples, data may already be structured and may be easily input into the algorithms (e.g., CPT and ICD codes).

In other examples, data may take the form of unstructured, natural language text as in the case of an appeal letter, claim letter, claim denial letter, doctor's notes, etc. Accordingly, the data may be first processed to structure the data using different filtering or processing techniques, including as an example, utilizing various medical dictionaries. In other examples, the data from letters may be first structured by identifying key words and phrases in the text that are relevant based on the data sources, including words or phrases in denial letters that are associated with healthcare authorizations (e.g., as opposed to focusing on medical terms from medical dictionaries).

Specifically, structuring of the data may refer to identifying and categorizing each piece of data in each of the labeled sets. For example, the data in each labeled set can be categorized into one or more of a plurality of fields, including, for example, a provider name, a provider address, a provider phone number, a payer name, a payer address, a payer phone number, a patient name, a patient address, a patient phone number, a patient social security number or other identifier, a patient date of birth, doctor notes associated with the patient and/or procedure, a procedure code, a diagnosis code, a services provided date, a billed amount, a claim number, an insurance group number, a plan number, a claim denial date, an allowed amount, a deductible amount, a co-pay amount, an adjustment code, a payment amount, an appeal deadline date, or any combination thereof.

In some implementations, the fourth step 140 includes analyzing the labeled, selected data to identify a master set of key words and/or phrases used in the labeled, selected data. For example, the master set of key words or phrases can be associated with approved appeals and/or denied appeals. Because there may be numerous words and phrases in the data that are generally not correlated with the appeal outcome, selecting a master set of key words and/or phrases from the data aids the machine learning algorithm in identifying patterns and successfully predicting outcomes.

The master set of key words and phrases can be extracted from, for example, insurance claim forms prepared by one or more providers, insurance claim appeal forms prepared by one or more providers, doctor notes associated with one or more patients, explanation of benefit forms prepared by the payer, claim denial letters prepared by the payer, claim acceptance letters prepared by one or more payers, or any combination thereof.

To aid in identifying the master set of key words and/or phrases, the fourth step 140 can include comparing words and phrases in the labeled, selected data to words and phrases contained a medical library (e.g., a medical dictionary, medical guidelines, etc.) For example, if the phrase "medial collateral ligament" appears within both the selected data (e.g., doctor's notes) and the medical library, the phrase will be identified as part of the master set of key words and/or phrases.

In some implementations, the method 100 does not include the optional fourth step 140. Rather, in such implementations the selected training data is inputted into the machine learning algorithm during the fourth step 140 without categorizing the data into one or more of a plurality of fields. This type of machine learning where the training data is not categorized is referred to as "unstructured learning." In other implementations, the method 100 includes using a combination of structured learning and unstructured learning (e.g., a first portion of the selected data is categorized into one or more of a plurality of fields and a second portion of the selected data is not categorized).

The fifth step 150 of the method 100 includes inputting the labeled, structured training data from step 140 into a machine learning algorithm, such as, for example, decision trees ("DT"), Bayesian networks ("BN"), artificial neural network ("ANN"), support vector machines ("SVM"), deep learning algorithms, or any combination thereof.

Decision trees ("DT") are advantageous because of their simplicity and ease of understanding. DT are classification graphs that match input data to questions asked at each consecutive step in a decision tree. The DT program moves down the "branches" of the tree based on the answers to the questions (e.g., the first branch asks: does the payer cover a particular procedure code? returns yes or no. The second branch asks: does payer cover the billed amount for the procedure code? returns yes or no, etc.)

In one example, a first branch of the DT program asks whether the payer covers a given procedure code, and if the answer is yes, a second branch asks whether the key words or phrases identified during the fourth step are associated with the procedure code based on its training. If the answer to the second branch is no, the third branch of the DT program, which asks whether an appeal will be accepted, may return a no answer because according to the algorithm's training, this mismatched combination of key words or phrases and the procedure code is not associated with successful appeals. The DT program in this example can include another branch which asks whether the billed amount is less than a certain value that the algorithm has been trained to recognize as the upper limit of successful appeals. In this manner, the trained DT algorithm can predict appeal outcomes.

Bayesian networks ("BN") are based on the likelihood something is true depending on given independent variables and are modeled based on probabilistic relationships. BN are based purely on probabilistic relationships that determine the likelihood of one variable based on another or others. For example, BN can model the relationships between key words and phrases and appeal outcomes. Particularly, if certain key words or phrases are known, a BN can be used to compute the percentage likelihood that an appeal of a denied claim will be successful. Thus, using an efficient BN algorithm, an inference can be made based on the input data. BN algorithms are commonly used by the medical domain to represent reasoning under uncertain conditions for a wide range of applications, including disease diagnostics, genetic counseling, and emergency medical decision support system ("MDSS") design.

Artificial neural networks ("ANN") are computational models inspired by an animal's central nervous system and map inputs to outputs through a network of nodes. However, unlike BN, in ANN, the nodes do not necessarily represent any actual variable. Accordingly, ANN may have a hidden layer of nodes that are not represented by a known variable to an observer. ANN's are capable of pattern recognition and have been used for the medical and diagnostics fields. Their computing methods make it easier to understand a complex and unclear process that might go on during diagnosis of an illness based on a variety of input data including symptoms.

Support vector machines ("SVM") came about from a framework utilizing of machine learning statistics and vector spaces (a linear algebra concept that signifies the number of dimensions in linear space) equipped with some kind of limit-related structure. In some cases, SVMs may determine a new coordinate system that easily separates inputs into two classifications. For example, a SVM could identify a line that separates two sets of points originating from different classifications of events. SVMs have been applied practically and are theoretically well-founded, but can sometimes be difficult to understand. SVMs have been applied to a number of biological domains, such as MDSS for the diagnosis of tuberculosis infection, tumor classification, and biomarker discovery.

Another type of machine learning algorithm capable of modeling very complex relationships that have a lot of variation are deep neural networks ("DNN"). In the IT industry fields, various architectures of DNN have been proposed to tackle the problems associated with algorithms such as ANN by many researchers during the last few decades. These types of DNN are CNN (Convolutional Neural Network), RBM (Restricted Boltzmann Machine), LSTM (Long Short Term Memory) etc. They are all based on the theory of ANN. They demonstrate a better performance by overcoming the back-propagation error diminishing problem associated with ANN.

While some examples of machine learning algorithms are described herein, it should be understood that any suitable machine learning algorithms or techniques (e.g., supervised machine learning algorithms/techniques, unsupervised algorithms/techniques, or any combination thereof) can be used within any step of the method 100.

The optional sixth step 160 of the method 100 includes selecting validation data from the raw data received during the first step 110 (e.g., a portion of the raw data that is different than the selected training data from the second step 120). The validation data can be labeled and structured in the same or similar manner as the selected training data during the third step 130 and the fourth step 140 described above. The validation data can then be inputted into the machine learning algorithm (fifth step 150) to test and validate the machine learning model. For example, validation data associated with granted appeals and/or denied appeals can be labeled as such, structured, and input into the machine learning algorithm to determine whether the machine learning algorithm is sufficiently trained to predict appeal outcome (e.g., the machine learning algorithm predicts the correct outcome more than 80% of the time, the machine learning algorithm predicts the correct outcome more than 90% of the time, predicts the correct outcome more than 99% of the time, etc.) In this manner, the trained machine learning algorithm can be validated before being implemented into another method, such as, for example, the methods 200, 300 described in further detail below.

The seventh step 170 includes obtaining a trained machine learning algorithm. As described in further detail below, the trained machine learning algorithm can be trained for a variety of applications. For example, the machine learning algorithm can be trained to predict insurance claim submission outcomes, the machine learning algorithms can be trained to determine a percentage likelihood that an insurance claim submission will result in a paid claim, the machine learning algorithm can be trained to identify key words and/or phrases for improving the percentage likelihood of an insurance claim submission resulting in a paid claim, the machine learning algorithm can be trained to predict insurance claim appeal outcomes, the machine learning algorithm can be trained to determine a percentage likelihood of a successful appeal resulting in a paid claim, the machine learning algorithm can be trained to predict a monetary value of a paid claim, the machine learning algorithm can be trained to identify key words and/or phrases for populating an appeal document, etc.

In some implementations, the method 100 can be repeated one or more times to obtain a plurality of machine learning algorithms where each of the plurality of machine learning algorithms is associated with a different payer (e.g., a first machine learning algorithm is associated with a first insurance company and a second machine learning algorithm is associated with a second insurance company). In such implementations, the second step 120 is repeated and includes selecting training data associated with a second payer that is different than the first payer described above in the first iteration of the method 100. Then, the third step 130 through the seventh step 170 are repeated using this selected training data to obtain a second trained machine learning algorithm that is different than the machine learning algorithm obtained during the first iteration of the method 100.

Predicting Outcomes of Prior Authorizations, Claims, and Appeals

Figure 2A:
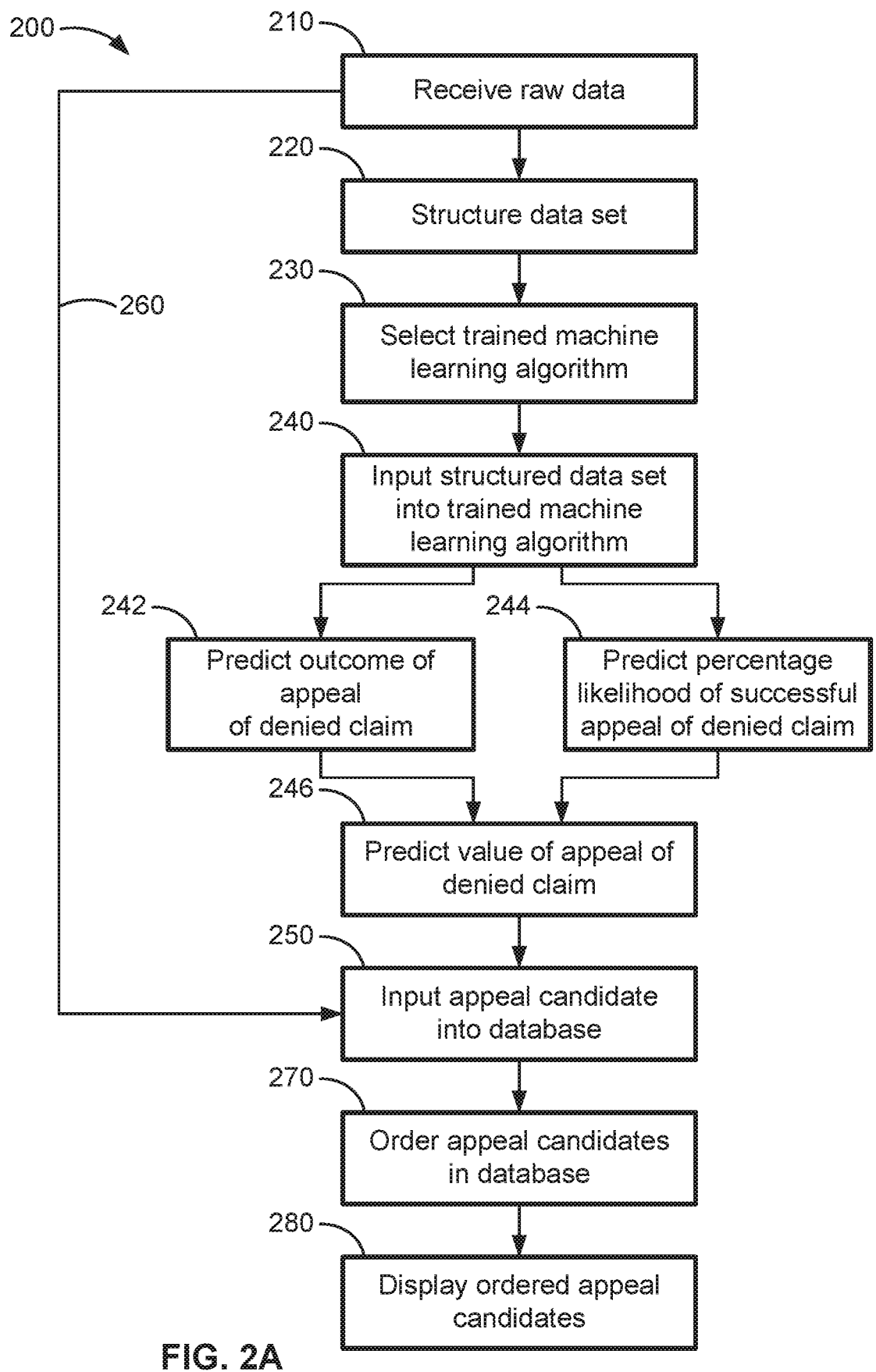
FIG. 2A is a process flow diagram of a method for prioritizing denied insurance claims for appeal to one or more payers according to some implementations of the present disclosure.

Referring to FIG. 2A, disclosed is an example method 200 for prioritizing denied insurance claims for appeal to one or more payers including a first step 210, a second step 220, a third step 230, a fourth step 240, a fifth step 250, a sixth step 260, a seventh step 270, and an optional eighth step 280. In some examples, this methodology could be applied to prior authorizations and claims. In this example, the method 200 is used to predict the outcome of an appeal of a denied insurance claim, the percentage likelihood of an appeal of a denied insurance claim being successful, and/or the value of an appeal of a denied insurance claim using a machine learning algorithm (e.g., a machine learning algorithm trained using the method 100 described above). Using these predictions/determinations, the method 200 is used to prioritize denied claims for the provider to appeal and aid in effectively allocating the provider's resources.

The first step 210 of the method 200 includes receiving a set of raw data associated with a denied insurance claim. When a payer denies an insurance claim submitted by a provider, the provider receives a denial communication (e.g., a letter, an e-mail, etc.) from the payer containing data relevant to the claim denial (e.g., an adjustment code, etc.) In cases where the denial communication is a letter from the payer (e.g., as opposed to a communication in an electronic medium), the first step 210 can include converting the text of the denial communication into a machine-readable format using, for example, optical character recognition. During the first step 210, the data in the denial communication is received by and stored in a memory device of a system (e.g., a computer, a server, a tablet, a smartphone, etc.)

In some implementations, receiving the set of raw data during the first step 210 includes receiving voice data reproducible as a voice of a human (e.g., a doctor, a patient, a nurse, a provider employee, etc., or any combination thereof). For example, the voice data can include voice data from a doctor (e.g., the doctor's dictations of notes after a service instance), or the voice data can include voice data from a doctor, a patient, and/or other medical providers (e.g., the voice data represents all audio during the entire service instance and/or during a portion of the service instance/doctor visit). The voice data can be received from one or more microphones (e.g., for real-time processing) or from an audio file. In such implementations, the first step 210 can include processing/converting the voice data into a machine-readable format.

The second step 220 of the method 200 is similar to fourth step 140 of the method 100 described above in that the second step 220 includes structuring the received set of raw data into a plurality of data subsets, which can include, for example, a subset of data associated with the provider, a subset of data associated with the payer, a subset of data associated with the patient, a subset of data associated with the insurance claim, or any combination thereof. In other words, the data in the set of raw data is categorized into one or more of a plurality of fields.

The subset of data associated with the provider can include, for example, the provider name, the provider address, the provider phone number, or any combination thereof. The subset of data associated with the payer can include, for example, the payer name, the payer address, the payer phone number, or any combination thereof. The subset of data associated with the patient can include, for example, a patient name, a patient address, a patient phone number, a patient social security number or other identifier, a patient date of birth, or any combination thereof. The subset of data associated with the denied insurance claim can include, for example, doctor notes associated with the patient and/or procedure, a procedure code, a diagnosis code, a services provided date, a billed amount, a claim number, an insurance group number, a plan number, a claim denial date, an allowed amount, a deductible amount, a copay amount, an adjustment code, a payment amount, an appeal deadline date, or any combination thereof.

The third step 230 includes selecting one of a plurality of machine learning algorithms. Each of the plurality of machine learning algorithms can be stored in a memory device of a system (e.g., a computer, a server, a tablet, a smartphone, etc.) Each of the plurality of machine learning algorithms can be trained using the method 100 described above (FIG. 1) and is associated with a different payer (e.g., a first machine learning algorithm is associated with a first insurance company and a second machine learning algorithm is associated with a second insurance company). Using the structured data subsets from the second step 220, which includes a data subset associated with the payer (e.g., the payer name), the corresponding machine learning algorithm associated with the payer is selected from the plurality of machine learning algorithms.

The fourth step 240 includes inputting the structured data subsets from the second step 220 into the machine learning algorithm selected during the third step 230. For example, the data subset associated with the claim denial is inputted into the selected machine learning algorithm. With the data subset(s) inputted into the selected machine learning algorithm, the fourth step 240 includes a first substep 242 that predicts an outcome of an appeal of the denied claim to the payer. For example, the selected machine learning algorithm predicts whether an appeal will be successful (e.g., the machine learning algorithm returns a "yes" value) or whether the appeal will not be successful (e.g., the machine learning algorithm returns a "no" value). As described above, the selected machine learning algorithm is trained to predict the appeal outcome using the method 100 described above.

To illustrate by way of an example, one of the subsets of data from the second step 220 contains a procedure code associated with knee surgery and another one of the subsets of data from the second step 220 contains words from doctor notes that do not contain the word "knee" or "surgery," but instead include words associated with another procedure (e.g., the procedure code was mistakenly entered). In this example, the machine learning algorithm (which has been trained using the method 100) may predict that an appeal of the denied claim will be denied because the procedure code does not match the procedure described in the doctor notes. In another example, one of the subsets of data from the second step 220 contains a diagnosis code associated with influenza another one of the subsets of data from the second step 220 contains a billed amount which is $100,000. In this example, the machine learning algorithm may predict that an appeal of this denied claim will be denied because the billed amount is much higher than (e.g., 1000 percent higher) the billed amount in successful appeals using this diagnosis code.

Alternatively, in some implementations, the fourth step 240 includes a second substep 244 which includes determining a percentage likelihood that an appeal of the insurance claim to the payer will result in a paid claim. For example, the machine learning algorithm may determine that there is a 0 percent likelihood that the appeal will result in a paid claim, a 10 percent likelihood that the appeal will result in a paid claim, a 30 percent likelihood that the appeal will result in a paid claim, a 50 percent likelihood that the appeal will result in a paid claim, a 70 percent likelihood that the appeal will result in a paid claim, a 90 percent likelihood that the appeal will result in a paid claim, a 100 percent likelihood that the appeal will result in a paid claim, etc.

In some implementations, after determining the percentage likelihood during the second substep 244, the method 200 further includes adjusting, based on the determined likelihood the requested payment amount. For example, if the second sub step 244 determined a 10% likelihood of payment for a requested payment amount of $10,000, the requested payment amount can be adjusted to $5,000, for example. The adjusted requested payment amount is then inputted into the selected machine learning algorithm associated with the payer and the second substep 244 is repeated to determine a second percentage likelihood that an appeal will result in a paid claim. For example, using the adjusted requested payment amount, it may be determined that there is a 60% likelihood of payment for the adjusted requested payment amount. In this manner, the second substep 244 can be repeated one or more times and the requested payment amount can be adjusted until the second substep 244 returns a percentage likelihood that is greater than or equal to a predetermined percentage (e.g., over a 50% likelihood that the appeal will result in a paid claim, over a 90% likelihood that the appeal will result in a paid claim, etc.)

In some implementations, the fourth step 240 includes an optional third substep 246 that occurs after the first substep 242 or the second substep 244. The optional third substep 246 includes predicting the value of a paid claim from an appeal. For example, the machine learning algorithm can predict the actual value of the paid claim will be a percentage of the billed amount during the third substep 246 (e.g., $100, $1,000, $10,000, $100,000 etc.) Alternatively, in some implementations, the machine learning algorithm may predict the value of the paid claim as a percentage of the billed amount during the third substep 246 (e.g., 10 percent of the billed amount, 30 percent of the billed amount, 50 percent of the billed amount, 70 percent of the billed amount, 90 percent of the billed amount, 100 percent of the billed amount, etc.)

The fifth step 250 includes inputting the output of the fourth step 140 and one or more of the structured subsets of data from the second step 220 into a database as an appeal candidate entry. The database is stored on a memory device of a system and can be displayed on a display device. As described in further detail below, the entries in the database can be ordered to prioritize insurance claim appeal candidates according to one or more variables.

The sixth step 260 includes repeating, one or more times, each of the first step 210, the second step 220, the third step 230, the fourth step 240 (including the first substep 242, the second substep 244, the third substep 246, or any combination thereof), and the fifth step 250. For example, a second set of data associated with a second denied insurance claim is received during the first step 210. The received second set of data is then structured during the second step 220. In some implementations, the second denied insurance claim was denied by a second payer that is different that the payer described above (e.g., a different insurance company). Thus, during the third step 230, a second one of the plurality of machine learning algorithms is selected that is the different than the selected one of the plurality of machine learning algorithms described above. The fourth step 140 includes inputting the structured data subsets from the second step 220 into the second machine learning algorithm. During the fifth step 250, the output of the second machine learning algorithm during the fourth step 240 and one or more of the structured second subsets of data from the second step 220 are input into the database as a second appeal candidate entry. In this manner, a plurality of appeal candidate entries can be added to the database by repeating the first step 210 through the fifth step 250 one or more times.

The seventh step 270 includes ordering the appeal candidate entries in the database such that appeal candidate entries that are either (1) entries predicted to result in paid claim on appeal or entries determined to have a high percentage likelihood of resulting in a paid claim on appeal; and/or (2) entries predicted to have a high claim value are prioritized. The appeal candidate entries can also be ordered or prioritized during the seventh step 270 based on the appeal deadline (e.g., such that a first appeal candidate entry with closer appeal deadline is ordered ahead of a second appeal candidate entry having an appeal deadline that is further away).

As described above, during the first substep 242 of the fourth step 240, the machine learning algorithm predicts that the appeal will result in a paid claim (e.g., the machine learning algorithm outputs "yes" or "no"). In such implementations, the seventh step 270 can include ordering the appeal candidate entries that are predicted to result in a paid claim in descending order according to the value of the paid claim predicted during the optional third substep 246. That is, the appeal candidate entries can be prioritized based on an estimated revenue that can be recovered. For example, a first appeal candidate with a predicted value of $10,000 would be ordered ahead of a second appeal candidate entry with a predicted value of $1,000). In this manner, the ordering aids the provider in allocating its appeal resources to appeal candidate entries that are most likely to result in a larger collection of funds from the payer.

As described above, using the alternative second substep 244, the fourth step 240 can determine a percentage likelihood that an appeal of the claim to the payer will result in a paid claim. In such implementations, the ordering during the seventh step 270 can include ordering the plurality of appeal candidate entries in descending order according to the determined percentage likelihood. For example, a first appeal candidate entry with a percentage likelihood of 95 percent would be ordered ahead of a second appeal candidate entry with a percentage likelihood of 50 percent. In other implementations, the ordering during the seventh step 270 can further include ordering the plurality of appeal candidate entries according to the determined percentage likelihood and the predicted value using an algorithm. For example, a first appeal candidate entry with a percentage likelihood of 80 percent with a predicted value of $10,000 would be ordered ahead of a second appeal candidate entry with a percentage likelihood of 95 percent and a predicted value of $100.

In some implementations, the method 200 includes an optional eighth step 280 that includes displaying on a display device of a system (e.g., a computer screen, a laptop screen, a tablet screen, a smartphone screen, a television) the ordered database of appeal candidate entries. Referring to FIG. 2B, an exemplary display 282 including an exemplary ordered database of appeal candidate entries 284A-284C is shown. A variety of parameters can be displayed for each of the appeal candidate entries 284A-284C, such as, for example, a claim number, a claim amount, a predicted value 286, payer information, an appeal deadline 288, patent information, agent information, or any combination thereof. As shown, the appeal candidate entries 284A-284C are ordered in descending order based on the predicted value 286. Alternatively, the appeal candidate entries 284A-284C can be ordered based on the appeal deadline 288, such that, for example, those entries with the most immediate deadlines appear first in the ordered list. While three appeal candidate entries 284A-284C are shown in FIG. 2B, any suitable number of appeal candidate entries can be displayed sequentially or simultaneously (e.g., one, two, ten, twenty, fifty, etc.) Moreover, the displayed ordered database 282 can include a search bar that permits a user to search for a desired appeal candidate entry using keywords or phrases for any of the parameters described herein. The user can also sort the displayed ordered appeal database 282 by the payer and/or a date range (e.g., days, months, years). Further, the user can export the displayed ordered appeal database 282 to another application or program (e.g., as a spreadsheet). Alternatively, the eighth step 280 can include printing out all or a portion of the ordered database of appeal candidate entries.

The optional eighth step 280 can also include updating the ordered database of appeal candidate entries in real-time based on newly inputted data. For example, a first appeal candidate that is ranked first in the ordered database may be moved down based on a second appeal candidate that the method 200 ranks higher than the first appeal candidate. In another example, based on newly inputted data, the percentage likelihood of a given appeal candidate in the ordered database may change and the optional eighth step 280 can include reordering the ordered database in real-time as percentage likelihoods fluctuate given the newest data.

While the method 200 has been described above as being used to predict the outcome of an appeal of a denied insurance claim or to determine a percentage likelihood that an appeal will result in a paid claim, for example, methods that are the same as, or similar to, the method 200 are contemplated herein for use more generally to obtain the same, or similar, outputs for insurance claims to be submitted to a payer and/or for prior-authorizations (e.g., as opposed to an appeal of a denied claim). In this manner, the method 200 can be used to predict outcomes of insurance claims at any stage in the life of an insurance claim (e.g., before a claim is first submitted to a payer, before or after a service is provided, after the claim is submitted to the payer but before the payer makes a decision, after a claim is denied but before the denied claim is appealed, after a denied claim has been appealed, etc.)

For example, in some implementations, a method that is the similar to the method 200 can be used to predict an outcome of a prior-authorization, a claim, or an appeal of a denied claim. In such implementations, the method includes a first step that is similar to the first step 210 described above, which includes receiving (e.g., at a server) at least a natural language data file representing doctors notes from a provider visit related to a service instance. Method also includes a second step that is similar to the second step 220 described above, which includes receiving (e.g., at the server), a structured data set including patient profile data, diagnosis and procedure codes, and quantitative data related to a payment requested. The method includes a third step that is similar to the first substep 242 of the fourth step 240 described above, which includes processing at least the natural language data by an unsupervised machine learning algorithm, and determining, based on the output of the unsupervised machine learning algorithm and the structured data a predicted outcome of the payment requested. The method also includes outputting an indication of the predicted outcome of the payment requested.

Populating an Appeal Document

Figure 3:
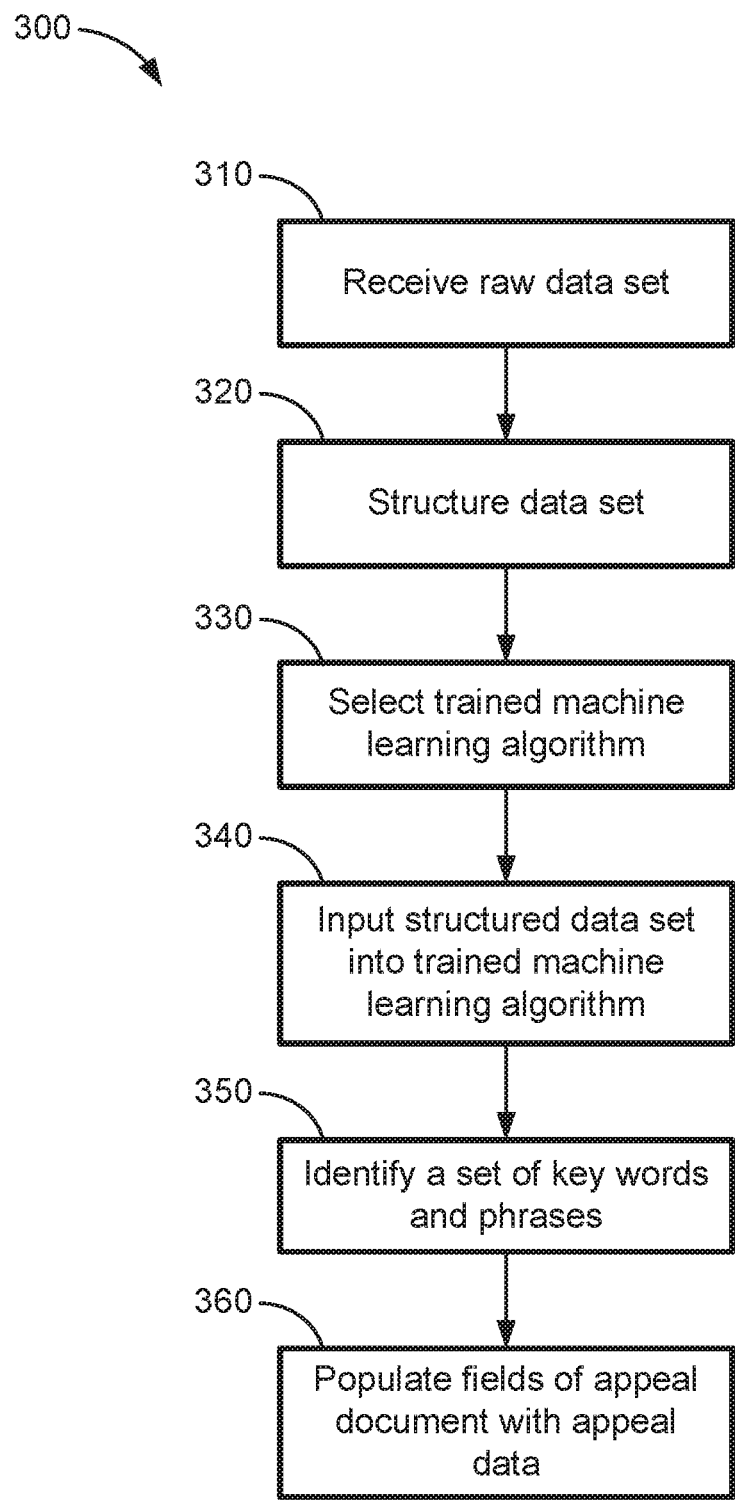
FIG. 3 is a process flow diagram of a method for populating an appeal document for submission to a payer according to some implementations of the present disclosure.

Referring to FIG. 3, disclosed is an example of a method 300 of populating an appeal document (e.g., the appeal document 400 shown in FIG. 4) for submission to a payer or a third party and includes a first step 310, a second step 320, a third step 330, a fourth step 340, a fifth step 350, and a sixth step 360.

The first step 310 is the same as or similar to the first step 210 of the method 200 described above in that the first step 310 includes receiving a set of raw data associated with a denied insurance claim. During the first step 310, the raw data in the denial communication is received by and stored in a memory device of a system (e.g., a computer, a server, a tablet, a smartphone, etc.) as machine readable code.

The second step 320 is the same as, or similar to, the second step 220 of the method 200 described above and includes structuring the received set of raw data into a plurality of data subsets, which can include, for example, a subset of data associated with the provider, a subset of data associated with the payer, a subset of data associated with the patient, a subset of data associated with the insurance claim, or any combination thereof.

The subset of data associated with the provider can include, for example, the provider name, the provider address, the provider phone number, or any combination thereof. The subset of data associated with the payer can include, for example, the payer name, the payer address, the payer phone number, or any combination thereof. The subset of data associated with the patient can include, for example, a patient name, a patient address, a patient phone number, a patient social security number or other identifier, a patient date of birth, or any combination thereof. The subset of data associated with the denied insurance claim can include, for example, doctor notes associated with the patient and/or procedure, a procedure code, a diagnosis code, a services provided date, a billed amount, a claim number, an insurance group number, a plan number, a claim denial date, an allowed amount, a deductible amount, a copay amount, an adjustment code, a payment amount, an appeal deadline date, or any combination thereof.

The third step 330 includes selecting one of a plurality of trained machine learning algorithms. Each of the plurality of machine learning algorithms is stored as machine executable code in a memory device of a system (e.g., a computer, a server, a tablet, a smartphone, etc.) Each of the plurality of machine learning algorithms can be trained using the method 100 described above (FIG. 1) and is associated with a different payer (e.g., a first machine learning algorithm is associated with a first insurance company and a second machine learning algorithm is associated with a second insurance company). Using the structured data subsets from the second step 320, which includes a data subset associated with the payer, the machine learning algorithm associated with the payer is selected from the plurality of machine learning algorithms stored in the memory device.

The fourth step 340 includes inputting all or a portion of the structured data set into the trained machine learning algorithm selected during the third step 330. The fifth step 350 includes identifying, using the selected, trained machine learning algorithm, a set of key words and phrases to be used in populating an appeal document (e.g., the appeal document 400 of FIG. 4). More specifically, the identified set of key words and phrases are identified by the trained machine learning algorithm as being associated with approved appeals and thus aid in increases the likelihood of the populated appeal document being approved by the payer.

For example, one of the inputted subsets of data includes a procedure code associated with MRI imaging and another one of the inputted subsets of data includes an adjustment code that is associated with a decision by the payer that the procedure was not medically necessary. In this example, the trained machine learning algorithm can identify key sets of words and phrases from another one of the inputted subsets of data, the doctor notes, such as "medical collateral ligament tear," which the machine learning algorithm has been trained to associated with accepted appeals for the payer. Thus, in this example, the set of key words and phrases outputted from the machine learning algorithm are populated in an appeal document during the sixth step 360 described below and aid in increasing the likelihood that the appeal document will be accepted by the payer.

Figure 4:
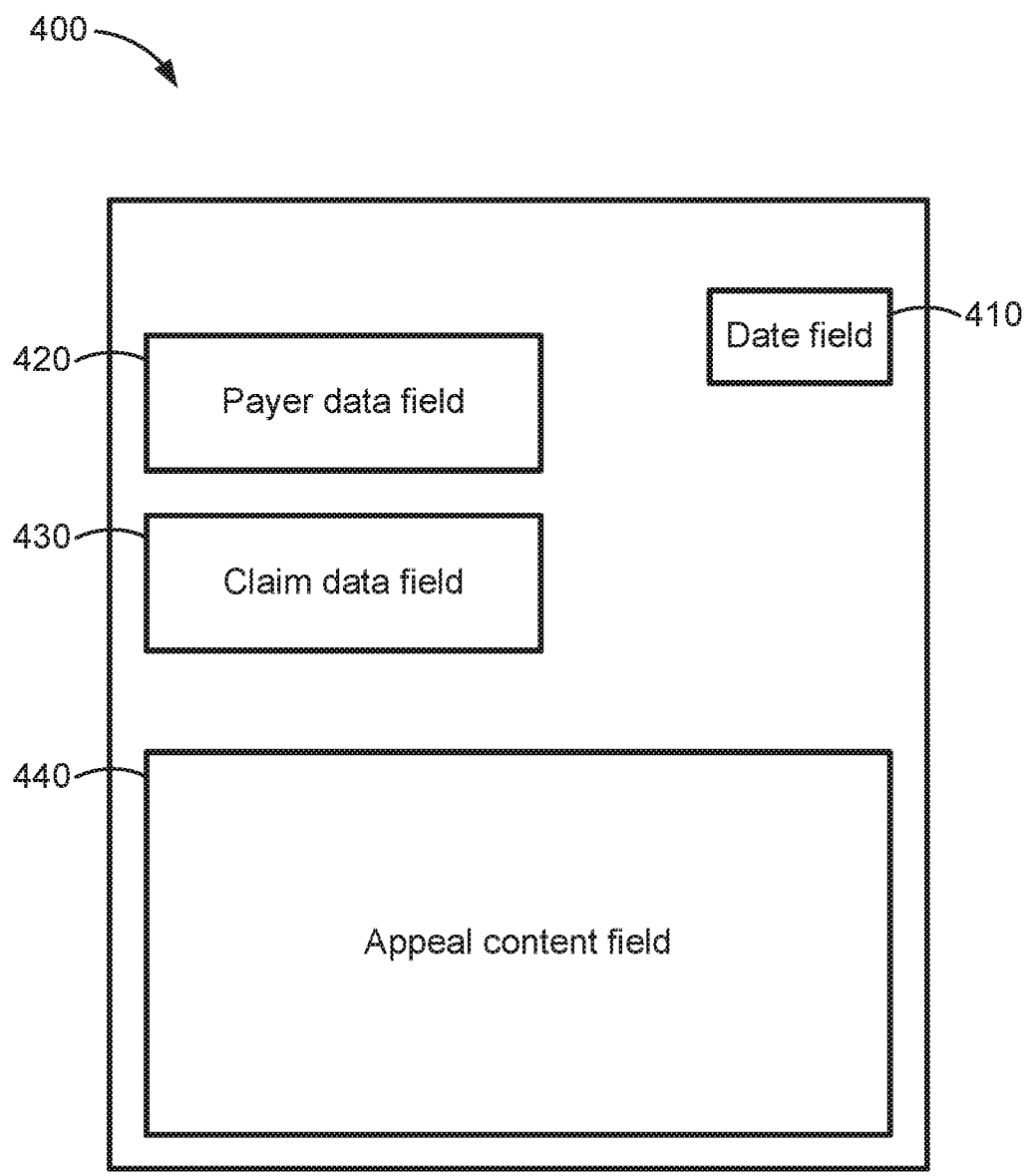
FIG. 4 is a schematic representation of the appeal document of FIG. 3 according to some implementations of the present disclosure.

The sixth step 360 includes populating fields of an appeal document with appeal data, including the set of key words and phrases identified during the fifth step 350. Referring to FIG. 4 the appeal document 400 includes a date field 410, a payer data field 420, a claim data field 430, and an appeal content field 440. As described above, the inputted, structured data can include an appeal deadline, and this appeal deadline is populated in the date field 410 of the appeal document 400. As described above, the inputted, structured data can include information associated with the payer, such as, for example, the payer name, address, phone number, or other identifying information. This inputted, structured information is populated in the payer data field 420 of the appeal document 400. Similarly, as described above, the trained machine learning algorithm identifies a set of key words and phrases that are associated with granted appeals, and this set of key words and phrases is populated in the appeal content field 440 of the appeal document or as suggested text phrases that may optionally be input.

The identified key words and phrases that are populated in the appeal content field 440 can be populated in the form of full sentences or bullet points which a user can then use in drafting full sentences to complete the appeal document 400. Further, it should be understood that the appeal document 400 can more generally include more or less fields relevant to an appeal of a denied insurance claim that can be populated using the method 300 described above.

In some implementations, the method 300 can further include displaying the populated appeal document on a display device, printing out all or a portion of the populated appeal document, and/or sending the populated appeal document to the payer in an electronic medium for a decision.

In some implementations, the identified key words or phrases from step 350 can be communicate to a provider (e.g., a doctor's office) rather than, or in addition to, being populated in the appeal document 400. In such implementations, the provider (e.g., doctor) can use the identified key words or phrases during an appointment with a patient so that the key words or phrases will be included in the doctor's notes. As described herein, the language in the doctor's notes is often an important factor in whether a claim is granted or denied in the first instance and/or on appeal. Thus, inserting these key words or phrases at the outset in the initial doctor's notes can aid in increasing the likelihood that a claim will be paid by the payer upon the initial submission.

In some implementations, the methods 100, 200, and 300 described above can be used conjunctively. For example, in such implementations, the method 100 can be used to train a machine learning algorithm to predict outcomes of insurance appeal claims submitted to a first payer and/or predict the value of the paid claim from a successful appeal. Using the trained machine learning algorithm obtained from the method 100, the method 200 is then used to obtain an ordered database of appeal candidate entries based on (i) the predicted outcome of the appeal according to the trained machine learning algorithm, (ii) the predicted value of the paid claim from a successful appeal according to the trained machine learning algorithm, or (iii) both. Using the method 300 fields of an appeal document are populated for each of the appeal candidate entries in the ordered database, with the first appeal candidate entry in the ordered database being first, etc. In this manner, the methods 100, 200, and 300 can be used together in some implementations to both prioritize which denied insurance claims to appeal and to populate fields of appeal documents according to the prioritization.

Figure 5:
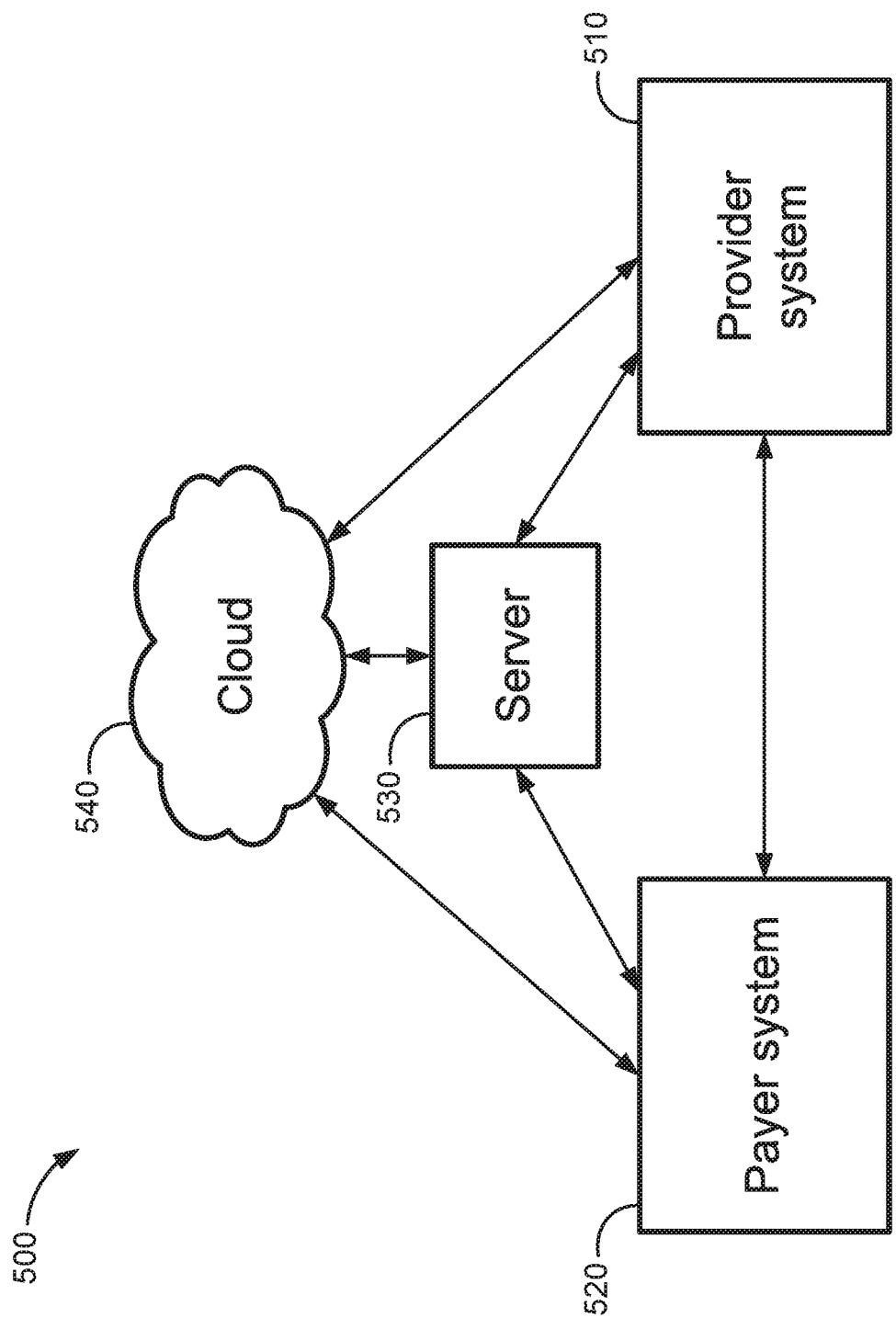
FIG. 5 is a block diagram of a network for implementing the method of FIG. 1, the method of FIG. 2A, and/or the method of FIG. 3 according to some implementations of the present disclosure.

Referring to FIG. 5, the method 100, the method 200, and/or the method 300 described herein can be implemented with a network 500 that includes a provider system 510, a payer system 520, a server 530, and a cloud system 540. Each of the provider system 510, the payer system 520, the server 530, and the cloud system 540 includes a memory device for storing machine executable instructions and one or more processors for executing the machine executable instructions. The memory device of the provider system 510, the payer 520 system, the server 530, and the cloud system 540, or any combination thereof can be configured to communicate with one another (e.g., send and receive data).

Any of the trained or untrained machine learning algorithms described herein can be stored in the memory device of the provider system 510, the server 530, and the cloud system 540, or any combination thereof. The training of the machine learning algorithms described during the method 100 can be implemented using the one or more processors of the memory device of the provider system 510, the server 530, and the cloud system 540, or any combination thereof. Likewise, any of the data sets described herein (e.g., the raw data set received during the first step 210 of the method 200, the structured data set from the second step 220 of the method 200, etc.), the ordered database described in reference to the seventh step 270 of the method 200, the appeal document 400, etc., can be stored in the memory device of the provider system 510, the server 530, and the cloud system 540, or any combination thereof. More generally, any of the steps of the methods 100, 200, and 300 can be implemented using any one of the provider system 510, the server 530, and the cloud system 540, or any combination thereof.

Figure 6:
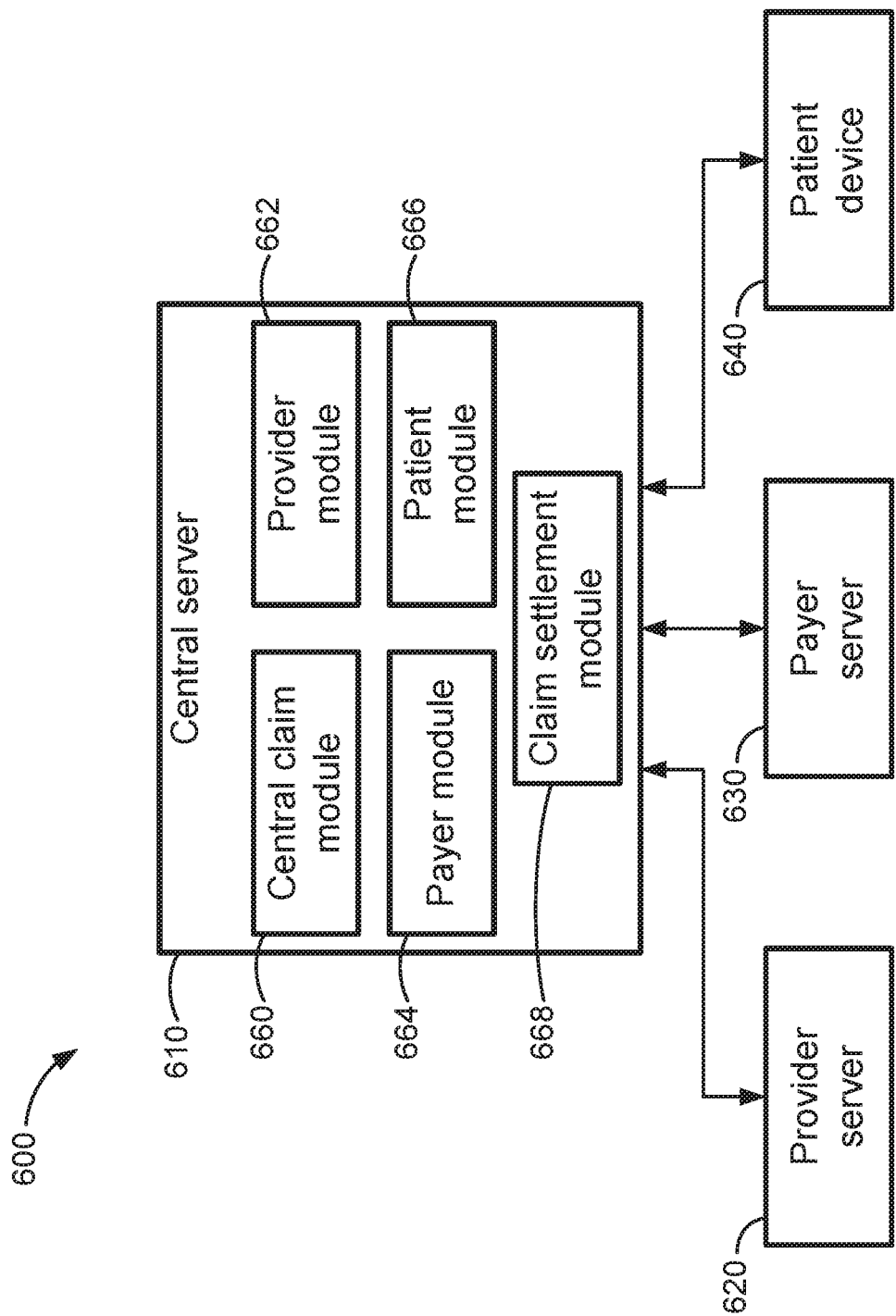
FIG. 6 is a schematic representation of a claim platform system according to some implementations of the present disclosure.

Referring to FIG. 6, a claim platform system 600 includes a central server 610, a provider server 620, a payer server 630, and a patient device 640. Each of the central server 610, the provider server 620, the payer server 630, and the patient device 640 includes a memory device for storing machine executable instructions and one or more processors for executing the machine executable instructions. The provider server 620, the payer server 630, and the patient device 640 are each communicatively coupled to the central server 610 such that data can be transmitted between the central server 610 and each of the provider server 620, the payer server 630, and the patient device 640. The central server 610 includes a central claim module 660, a provider module 662, a payer module 664, a patient module 666, and a claim settlement module 668. Each of the modules can be implemented using methods that are the same, or similar to, the methods 100, 200, 300 (or any combination thereof) described above.

The central claim module 660 is stored on the central server 610 and can be accessed by the provider server 620, the payer server 630, the patient device 640, or any combination thereof. The central claim module 660 includes a set of data associated with one or more insurance claims permits all parties (e.g., the provider, the payer, and/or the patient) to view the same information associated with the one or more insurance claims. For example, each of the provider, the payer, and the patient can view the requested payment amount associated with an insurance claim through the claim module 660.

The provider module 662 is stored on the central server 610 and can be accessed by the provider server 620. In some implementations, the provider module 662 can display a dashboard on a provider device (e.g., computer) that is connected to the provider server 620. The provider module 662 can further include a notification module, a workflow module, an analytics module, or any combination thereof that populate the dashboard on the provider device. For example, the notification module can be configured to transmit a notification to the provider server 620 that alerts the provider, via the displayed dashboard, regarding the status of an insurance claim (e.g., a payer has denied a claim). The analytics module can be configured to determine, for example, a claim denial percentage for a given payer, and display that percentage via the dashboard.

The provider module 662 can be configured to, for example, predict the outcome of an insurance claim submitted by the provider to a payer, determine the percentage likelihood that an insurance claim submitted by the provider will result in a paid claim, determine the percentage likelihood that an appeal of a denied insurance claim will result in a paid claim, etc., using methods that are the same as, or similar to, the methods 100, 200, and/or 300 described above. Using the workflow module, a prioritized list of denied claims to be submitted for appeal can be displayed on the dashboard through the provider server 620. In this manner, the dashboard can include provider specific information, such as, for example, a prioritized list of insurances claims for submission to one or more payers, a prioritized list of denied insurance claims to be appealed to one or more payers, etc. The provider module 662 can also receive data associated with a new insurance claim (or appeal) from the provider server 620 (e.g., the provider inputs the data manually or automatically through the dashboard displayed on a provider device, and this inputted data is transmitted to the central server 610 via the provider server 620).

The payer module 664 is stored on the central server 610 and can be accessed by the provider server 620. In some implementations, the payer module 664 displays a dashboard on a provider device (e.g., computer) that is connected to the provider server 630. The payer module 664 can further include a notification module, a workflow module, an analytics module, or any combination thereof that populate the dashboard on the payer device. The dashboard can include, for example, a list of insurance claims submitted by one or more providers, a list of insurance claim appeals submitted by one or more providers, etc. The payer module 664 can also receive payer data associated with an insurance claim (or appeal) from the provider server 630 (e.g., that the payer is denying the claim or appeal).

The patient module 666 is stored on the central server 610 and can be accessed by the patient device 640. In some implementations, the patient module 666 displays a dashboard on the patent device 640 (e.g., a smartphone). The patient module 666 can further include a notification module, a workflow module, an analytics module, or any combination thereof that populate the dashboard on the payer device. The dashboard displayed on the patient device 640 can include, for example, a list of insurance claims submitted by a provider on behalf of the patient, a list of insurance claims submitted by the patient, etc.

The claim settlement module 668 that can be accessed by the provider server 620, the payer server 630, the patient device 640, or any combination thereof. The claim settlement module 668 permits each party to settle one or more pending insurance claims at any point in the claim life cycle (e.g., after the claim has been initially submitted by a provider, during an appeal of a denied insurance claim, etc.) In some implementations, the claim settlement module 668 permits the provider and/or the payer to input one or more rules for settling one or more claims at any point during the claim lifecycle. For example, using the payer server 630 to communicate with the central server 610 and the claim settlement module 668, the payer can input a payment amount that it is willing to pay for a given insurance claim (e.g., 80% of the requested payment amount). Likewise, using the provider server 620 to communicate with the central server 610 and the claim settlement module 668, the provider can input a payment amount that is willing to accept for the insurance claim (e.g., 80% of the requested payment amount, which is based on the output of a machine learning algorithm configured to predict that the payer will pay 80% of the requested amount). In this example, the claim settlement module 668 can then notify, the provider, the payer, and/or the patient that the claim has been settled through an automated alert.

It should also be understood that the disclosure herein may be more generally implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It is to be understood that many modifications and variations may be devised given the above description of the general principles of the present disclosure. It is intended that all such modifications and variations be considered as within the spirit and scope of the present disclosure, as defined in the following claims.

What is claimed is:

1. A method of prioritizing denied insurance claims for appeal to one or more payers, the method comprising:
   receiving, from a first payer, a denial for a first insurance claim;
   receiving, from a second payer, a denial for a second insurance claim;
   training a first machine learning algorithm to determine a percentage likelihood that an appeal of an insurance claim to a first payer will result in a paid insurance claim, wherein the first machine learning algorithm is associated with the first payer;
   training a second machine learning algorithm to determine a percentage likelihood that an appeal of an insurance claim to a second payer will result in a paid insurance claim, wherein the second machine learning algorithm is associated with the second payer;
   receiving a first set of data associated with the first insurance claim denied by the first payer;
   receiving a second set of data associated with the second insurance claim denied by the second payer;
   inputting at least a portion of the first set of data into the first machine learning algorithm;
   using the first machine learning algorithm, determining a first percentage likelihood that an appeal of the first insurance claim to the first payer will result in a first paid claim;
   inputting at least a portion of the second set of data into the second machine learning algorithm;
   using the second machine learning algorithm, determining a second percentage likelihood that an appeal of the second insurance claim to the second payer will result in a second paid claim;
   generating, for the first insurance claim, an appeal document, wherein the appeal document includes an appeal content field, and wherein the generating the appeal document includes automatically populating the appeal content field based on sets of one or more of key words and phrases that are associated with granted appeals as determined by the first machine learning algorithm; and
   submitting, to the first payer, the appeal document.

2. The method of claim 1, further comprising ordering the first and second determined percentage likelihoods in a descending order.

3. The method of claim 2, further comprising displaying the ordered determined percentage likelihoods on a display device.

4. The method of claim 1, wherein the first determined percentage likelihood is different from the second determined percentage likelihood.

5. The method of claim 1, further comprising:
   using the first machine learning algorithm, predicting a monetary value of the first paid claim; and
   using the second machine learning algorithm, predicting a monetary value of the second paid claim.

6. The method of claim 5, further comprising displaying ordering the value of the first paid claim and the second paid claim in a descending order.

7. The method of claim 5, wherein the value of the first paid claim is different than the value of the second paid claim.

8. The method of claim 1, wherein the predicted outcome of the appeal of the first insurance claim to the first payer is different than the predicted outcome of the appeal to the second payer.

9. The method of claim 1, wherein the at least a portion of the first data set includes a denial communication associated with the first insurance claim and wherein the at least a portion of the second data set includes a denial communication associated with the second insurance claims.

10. The method of claim 1, further comprising:
determining, based on the first machine learning algorithm, one or more reasons why the first insurance claim was denied.

11. The method of claim 10, further comprising:
automatically populating, based on the one or more reasons why the first insurance claim was denied and the first set of data associated with the first insurance claim, an appeal document for the first insurance claim.

12. The method of claim 11, wherein the appeal document includes an appeal content field, and wherein the appeal content field is automatically populated based on sets of one or more of key words or phrases that are associated with granted appeals as determined by the first machine learning algorithm.

13. A method of prioritizing denied insurance claims for appeal to one or more payers, the method comprising:
receiving, from a first payer, a denial of a first insurance claim;
receiving, from a second payer, a denial of a second insurance claim;
training a first machine learning algorithm to predict outcomes of insurance claim appeals to a first payer, wherein the first machine learning algorithm is associated with the first payer;
training a second machine learning algorithm to predict outcomes of insurance claim appeals to a second payer different from the first payer, wherein the second machine learning algorithm is associated with the second payer;
receiving a first set of data associated with the first insurance claim denied by the first payer;
receiving a second set of data associated with the second insurance claim denied by the second payer;
inputting at least a portion of the first set of data into the first machine learning algorithm;
using the first machine learning algorithm, predicting an outcome of an appeal of the first insurance claim to the first payer;
inputting at least a portion of the second set of data into the second machine learning algorithm;
using the second machine learning algorithm, predicting an outcome of an appeal of the second insurance claim to the second payer;
displaying the predicted outcomes on a display device;
generating, for the first insurance claim, an appeal document, wherein the appeal document includes an appeal content field, and wherein the generating the appeal document includes automatically populating the appeal content field based on sets of one or more of key words and phrases that are associated with granted appeals as determined by the first machine learning algorithm; and
submitting, to the first payer, the appeal document.

14. The method of claim 13, further comprising:
using the first machine learning algorithm, predicting a monetary value of the first paid claim; and
using the second machine learning algorithm, predicting a monetary value of the second paid claim.

15. The method of claim 14, further comprising displaying ordering the value of the first paid claim and the second paid claim in a descending order.

16. The method of claim 14, wherein the value of the first paid claim is different than the value of the second paid claim.

17. A method of prioritizing denied insurance claims for appeal to one or more payers, the method comprising:
receiving, from a plurality of payers, denials for a plurality of insurance claims;
training a plurality of machine learning algorithms to predict outcomes of insurance claim appeals, each of the plurality of machine learning algorithms being associated with a respective one of the plurality of payers;
receiving a plurality of sets of data, each of the plurality of sets of data being associated with a respective one of the plurality of insurance claims denied by one of the plurality of payers;
for each of the received plurality of sets of data, inputting at least a portion of the received plurality of sets of data into a respective one of the plurality of machine learning algorithms that is associated with a respective one of the plurality of payers and, using the respective one of the plurality of machine learning algorithms, predicting an outcome of an appeal to the respective one of the plurality of payers;
displaying the predicted outcomes on a display device;
generating, for one of the plurality of insurance claims denied by one of the plurality of payers, an appeal document, wherein the appeal document includes an appeal content field, and wherein the generating the appeal document includes automatically populating the appeal content field based on sets of one or more key words and phrases that are associated with granted appeal as determined by at least one of the plurality of machine learning algorithms; and
submitting, to the one of the plurality of payers, the appeal document.

18. The method of claim 17, further comprising, prior to the displaying, grouping the denied insurance claims by predicted outcome.

19. A method of prioritizing denied insurance claims for appeal to one or more payers, the method comprising:
receiving, from a plurality of payers, denials for a plurality of insurance claims;
training a plurality of machine learning algorithms to predict outcomes of insurance claim appeals, each of the plurality of machine learning algorithms being associated with a respective one of the plurality of payers;
receiving a set of data associated with the plurality of denied insurance claims, each of the denied insurance claims being denied by one of the plurality of payers;
dividing the set of data into groups of data, each of the groups of data being associated with insurance claims denied by a respective one of the plurality of payers;
for each of the groups of data associated with insurance claims denied by a respective one of the plurality of payers, inputting at least a portion of the received set of data into a respective one of the plurality of machine learning algorithms that is associated with a respective one of the plurality of payers;
using the respective one of the plurality of machine learning algorithms, predicting an outcome of an appeal to the respective one of the plurality of payers;
grouping the plurality of denied insurance claims into a first group associated with a predicted approved outcome and into a second group associated with a predicted denial outcome;

displaying at least the first group associated with a predicted approved outcome on a display device;

generating, for one of the plurality of insurance claims denied by one of the plurality of payers, an appeal document, wherein the appeal document includes an appeal content field, and wherein the generating the appeal document includes automatically populating the appeal content field based on sets of one or more key words and phrases that are associated with granted appeal as determined by at least one of the plurality of machine learning algorithms; and submitting, to the one of the plurality of payers, the appeal document.

20. The method of claim 19, further comprising:

receiving a second set of data associated with a plurality of accepted insurance claims, each of the accepted insurance claims being associated with insurance claims accepted by a respective one of the plurality of payers;

dividing the second set of data into groups of data, each of the groups of data being associated with insurance claims accepted by a respective one of the plurality of payers; and for each of the groups of data associated with insurance claims accepted by a respective one of the plurality of payers, inputting at least a portion of the received second set of data into a respective one of the plurality of machine learning algorithms that is associated with a respective one of the plurality of payers.

\* \* \* \* \*